June 27, 1933.  W. P. KELLETT  1,915,498
SUPPLEMENTARY POWER PLANT FOR TRANSPORT VEHICLES
Filed Jan. 3, 1931   6 Sheets-Sheet 3

Inventor.
William Platts Kellett.

Patented June 27, 1933

1,915,498

UNITED STATES PATENT OFFICE

WILLIAM P. KELLETT, OF NEW YORK, N. Y.

SUPPLEMENTARY POWER PLANT FOR TRANSPORT VEHICLES

Application filed January 3, 1931. Serial No. 506,426.

The principal object of this invention is to provide means for automatically utilizing the kinetic energy of a vehicle or train of vehicles when moving on a down grade to generate power and to utilize the power so generated for the operation of power driven apparatus carried on the vehicle such as cooling or heating systems and to effectively store the excess power generated in such systems.

In the accompanying drawings, Figure 1 is an elementary diagram of the electrical equipment required in the installation of the present invention upon a vehicle.

Figure 1:
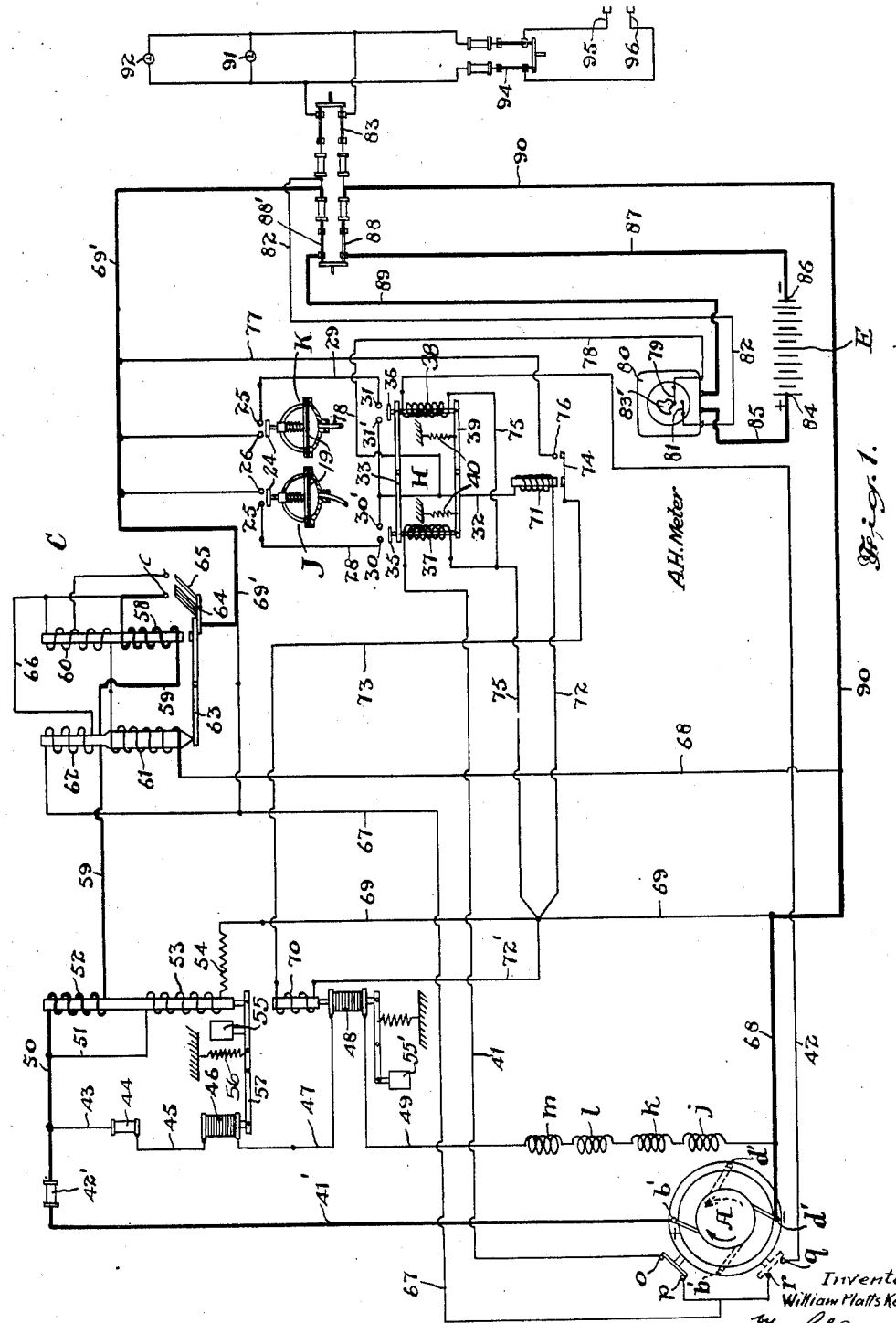
Figure 2:
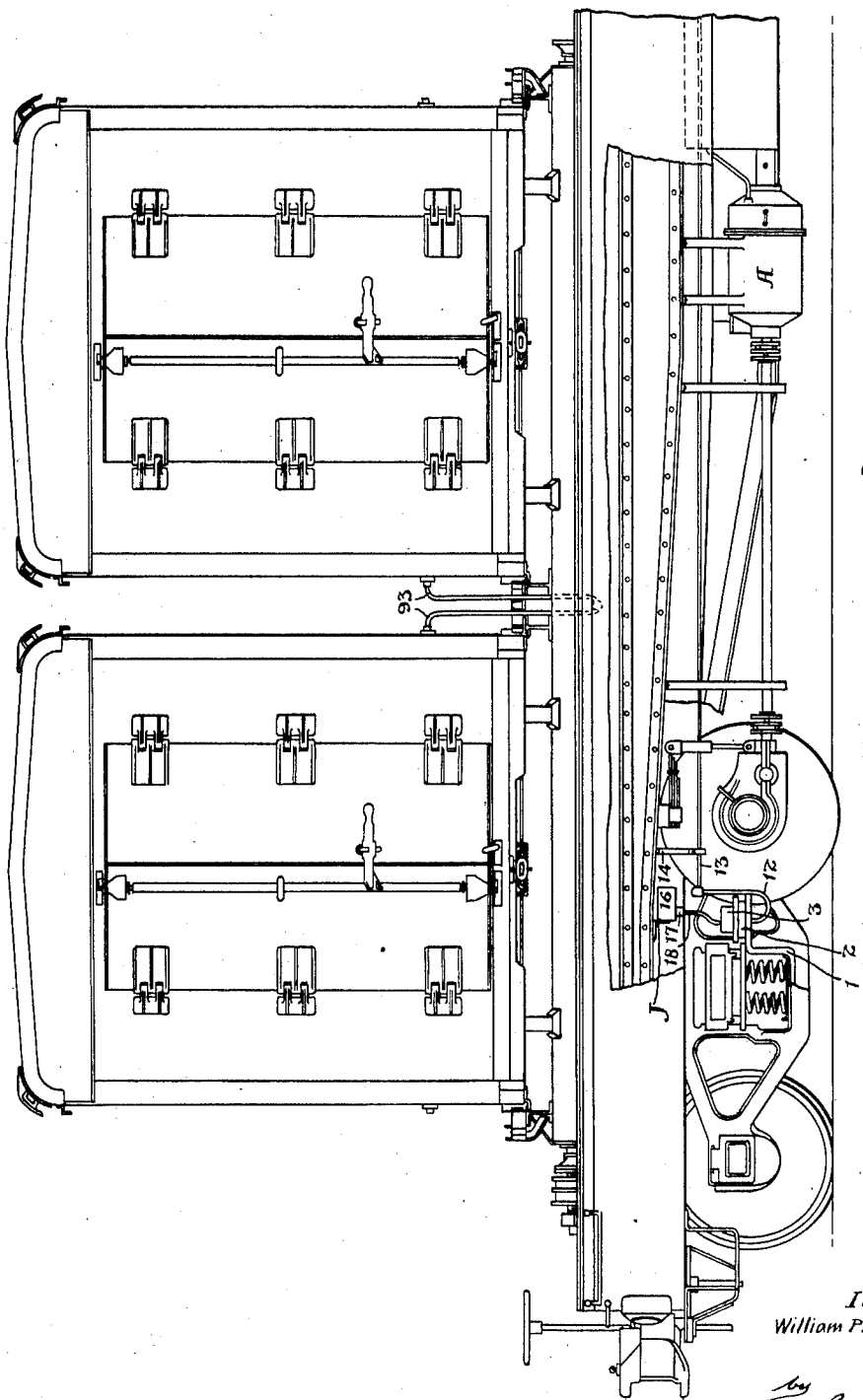
Figure 2 is a side elevational and part sectional view of a container type of railway car equipped with the present invention.
Figure 3:
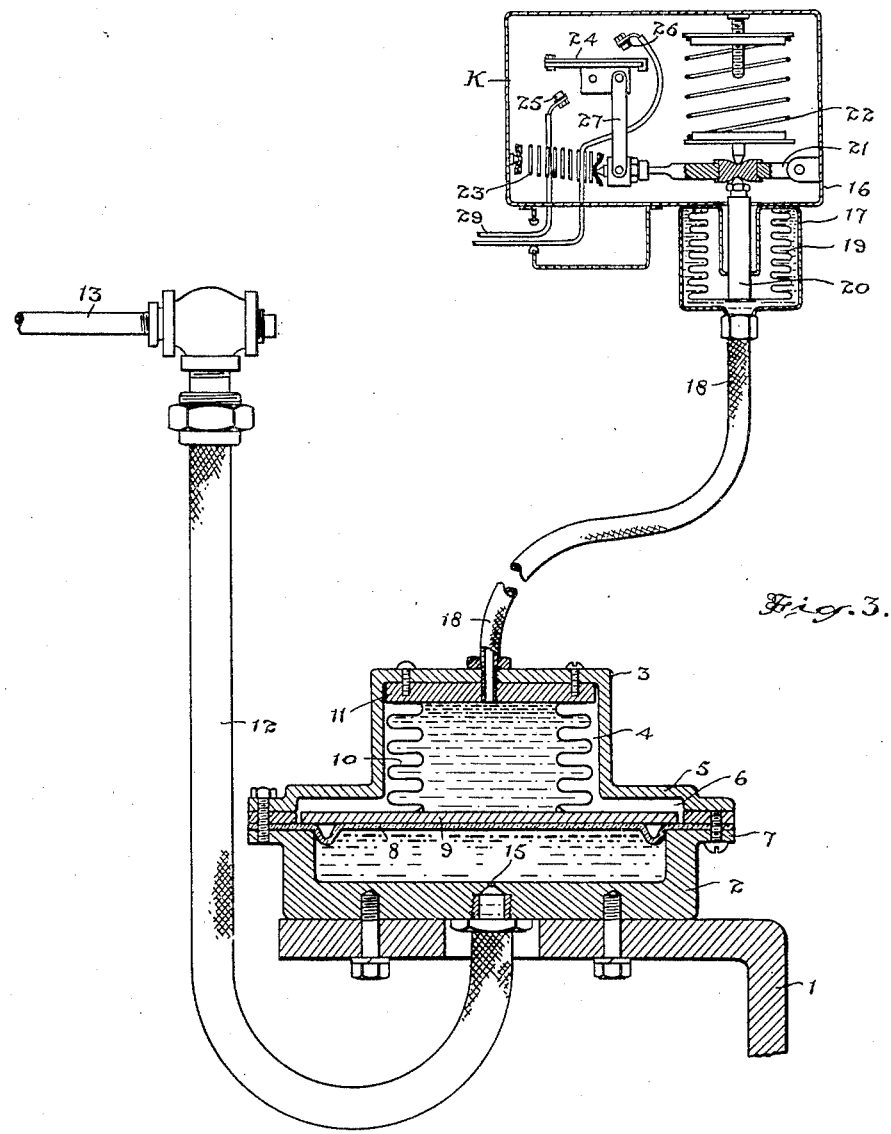
Figure 3 is an enlarged sectional detail of the fluid control of the electrical mechanism.
Figure 4:
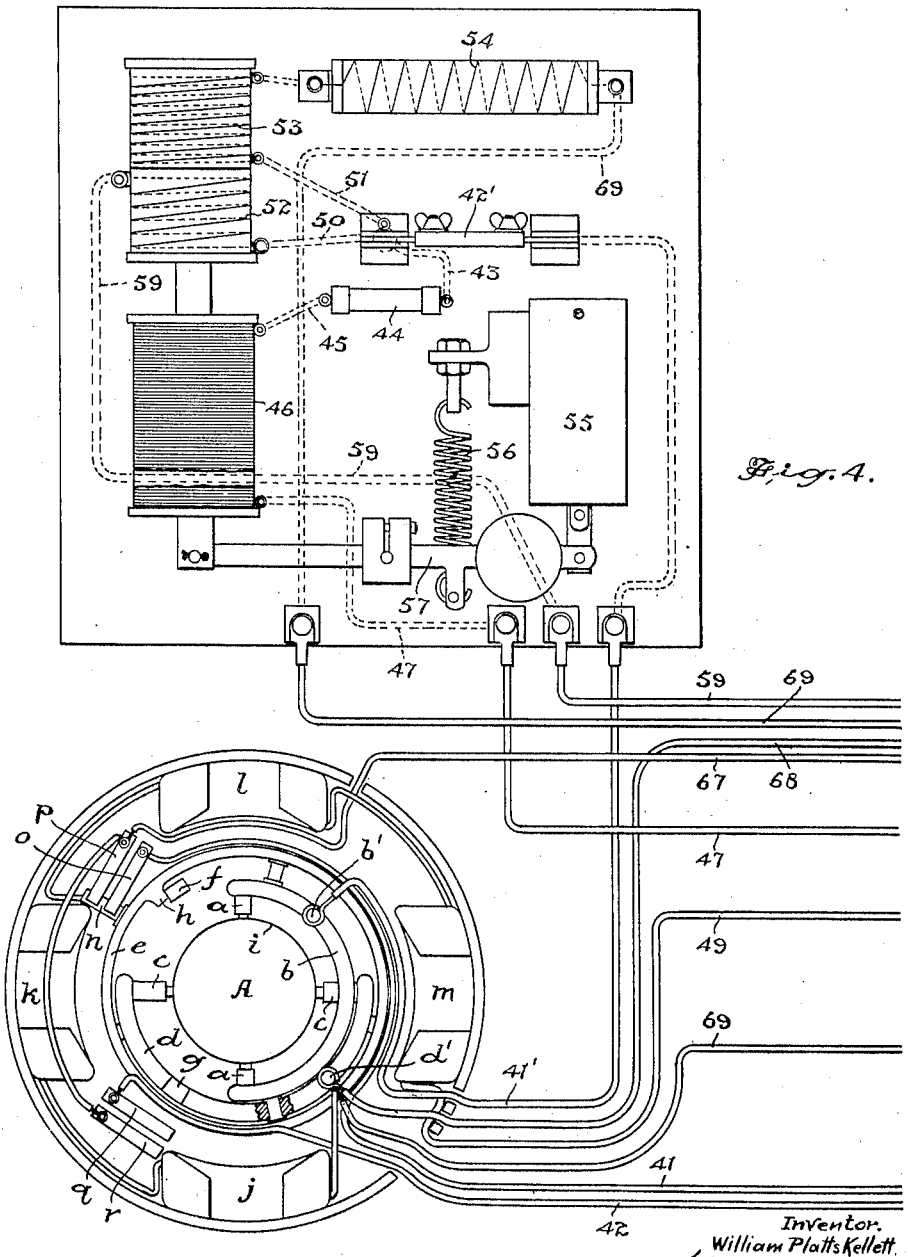
Figures 4, 5 and 6 are progressive diagrammatic plans of the electric mechanism shown in the diagram, Figure 1.
Figure 5:
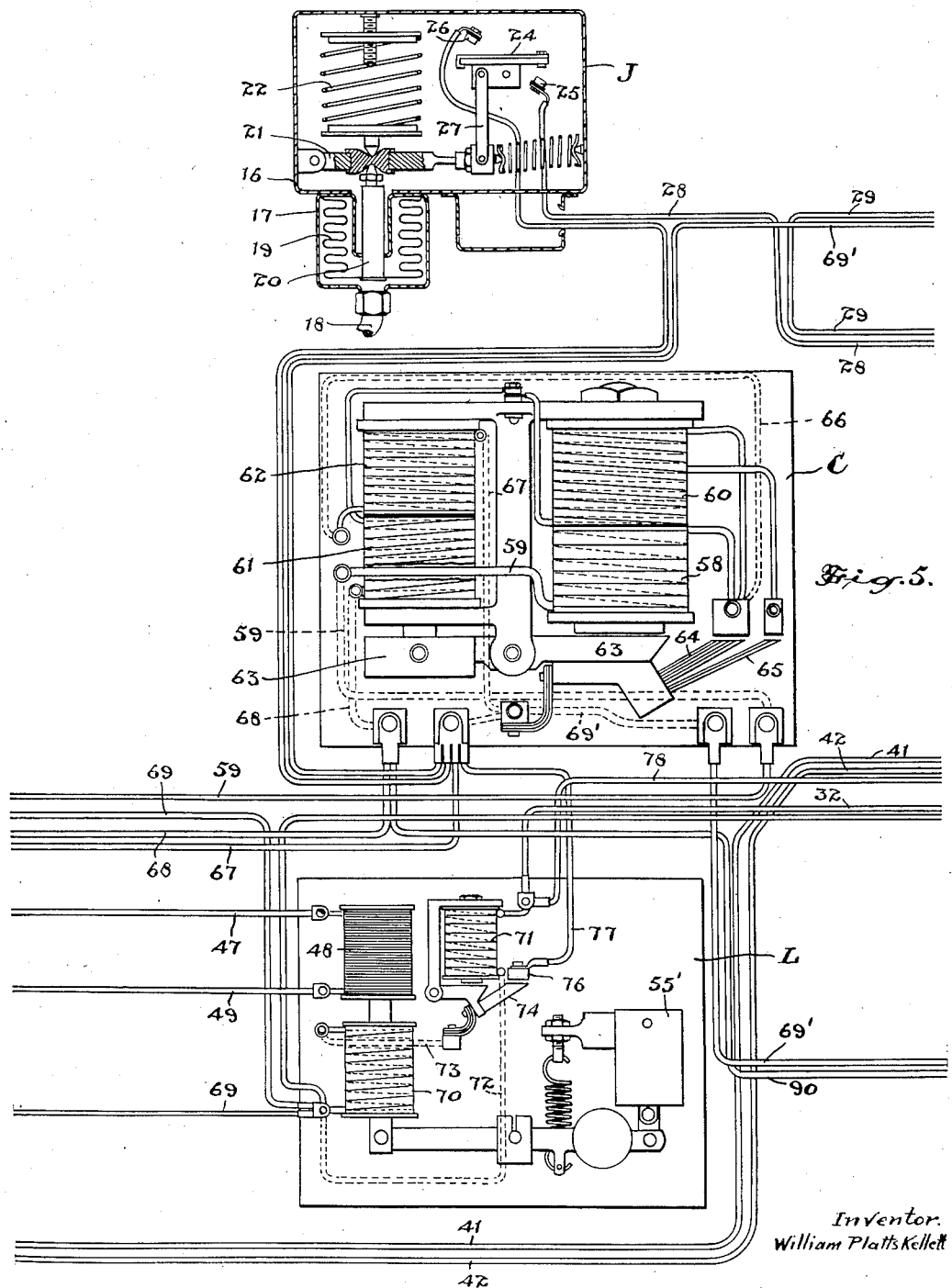
Figure 6:
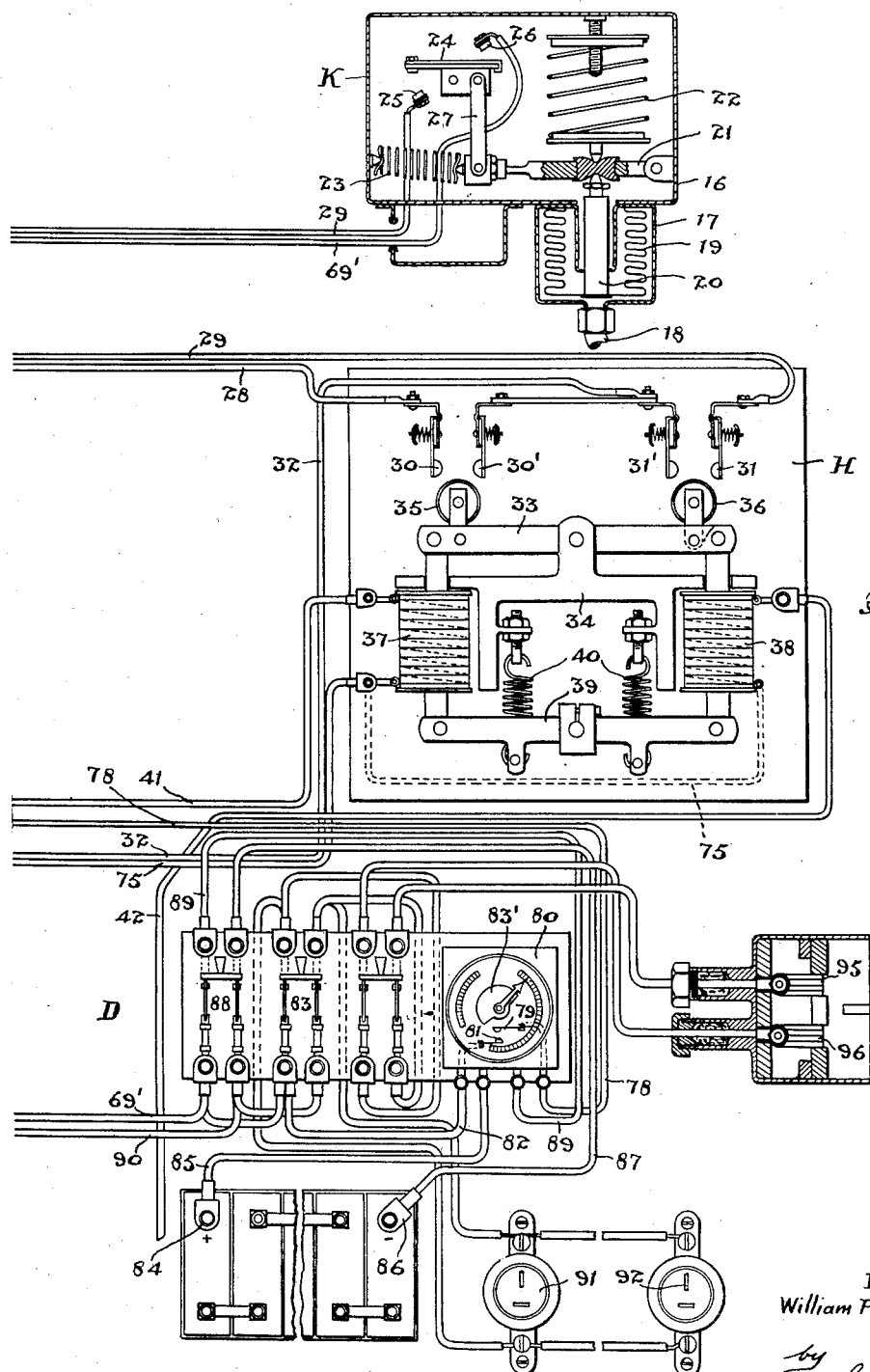

In my co-pending application Serial No. 436,632, filed March 17, 1930, I described broadly a system in which the change in hydrostatic pressure of a liquid column carried by a vehicle in travelling over grades was utilized to control switching means in accordance with the inclines encountered by the vehicle. I further described a grade selector system co-operating with the electric generator operatively connected with the running gear of the car, the main operating element of the grade selector system being a mercury container arranged longitudinally of the car with sylphons arranged at the end operatively connected preferably through auxiliary liquid columns with electric control devices adapted to close and open the generator circuit in accordance with grade conditions.

The present invention is an improvement thereover in that the control of the switching means by the hydrostatic means is automatically modified with regard to the direction of travel of the vehicle so that the system will function without manual attention regardless of the direction in which the car or vehicle may be called upon to travel.

The present invention further contemplates advanced structural features for the enhanced efficiency in the operation of the system as hereinafter referred to.

The principal features of the present invention consist in the novel arrangement of mechanisms whereby a selective switching device operating in conjunction with a reversible type of electric generator electrically connects the generator with the electrical equipment of the vehicle through the grade controlled switch at the forward end of the vehicle.

A further important feature consists in the novel arrangement for transmitting the mercury pressure to the sylphon controlled switch members whereby excess pressures on the more delicate apparatus are obviated and still further important features comprise the novel construction and arrangement of the several unit control members.

In the construction herein illustrated the invention is shown applied to a railway car and each of the trucks has rigidly secured thereto a bracket 1 upon which is rigidly mounted a cup member 2 and these cup members are arranged horizontally and the same distance above the track level.

Each of the cups is enclosed by a cap 3 which is provided with a central cylindrical portion 4 and an offset flange 5 which forms a shallow recess 6 above the shoulder 7 of the cap.

A flexible diaphragm seal 8, preferably of rubber, is secured between the offset flange of the cap and the flange of the cup and a plate 9, preferably of aluminum or other light strong material, is arranged within the recess 6 above the diaphragm and rests on the diaphragm over the shoulder 7.

The top surface of the plate 9 is spaced from the under side of the recess in the cap and the plate may rise under pressure of the mercury body within the cup 2 until it engages the cap. The movement of the plate is approximately one-quarter of an inch.

Within the cylindrical part of the cap 3 is arranged a sylphon bellows 10, the bottom end of which is secured to the plate 9 and the top to a plate 11 which is held securely within the cap.

Each cup 2 is connected by a flexible tube 12 to the horizontal tube 13 extending longitudinally of the car and supported by suitable brackets 14 from the car body.

Communication between the flexible tube 12 and the interior of the cup 2 is through a reduced opening 15 which prevents surging through sudden movement of the car.

Grade selector switches J and K are arranged at each end of the car adjacent to the mercury cups. The casings 16 enclosing these switches, which are of similar construction, are secured to the car body in any suitable manner and each is provided with a cylinder portion 17 on the underside which is connected by a flexible tube 18 with the plate 11 connected to the sylphon 10. The sylphon 10, tube 18 and cylinder 17 are filled with a light non-compressible fluid such as oil.

A sylphon bellows 19, closed at its bottom end, is secured at its upper end within the cylinder 17 so that upon pressure being applied to the fluid medium by compressing the sylphon 10 the lower end of the sylphon will be moved upwardly.

A stud 20 rigidly secured to the closed head end of the sylphon 19 extends into the body of the casing 16 and is provided with a point contact engaging a hinged arm 21 intermediate of its length.

An adjustable compression spring 22 engages the hinged arm opposite the contact point of the stud 20.

A compression spring 23 is mounted between the free end of the hinged arm 21 and the casing and forms with the arm a snap action break joint member.

A pivotal switch element 24 is arranged between the terminals 25 and 26 and is connected to the arm 21 by a link 27.

When the sylphon member operates in an upward direction it will move the pivotal arm upwardly until its contact with the end spring causes an upward snap to effect the closing of the switch, likewise, the movement of the switch is accelerated by the snap action of the spring. When pressure is removed from the sylphon the spring 22 operates against the hinged arm in a downward direction.

In the preparation of the equipment for service, the cups 2, flexible tubes 12 and horizontal tube 13 are filled with mercury or other suitable fluid so that the diaphragms 8 will engage the plates 9 as they rest upon the flanges of the cups 2. The sylphons 10 and flexible tubes 18 and the cylinders 17 of the grade selectors are filled with oil as hereinbefore mentioned and the springs 22 in the grade selectors J and K are adjusted to exert a slight initial pressure on the oil and therefore on the mercury when the car is level. This application of pressure by the adjustment of the spring 22 eliminates any play in the various parts and obviates any detrimental action in the jolting of the car in service.

When either end of the car is depressed to a lower level than the other, as on a down grade, the pressure of the mercury against the diaphragm in the lower cup is increased and presses upwardly on the diaphragm. The weight of mercury displaced by the difference in level is sufficient to lift the diaphragm at the low end of the car and with it the plate 9 so as to compress the sylphon 10 and force the column of oil in the tube 18 upwardly to effect compression of the sylphon 19 in the cylinder 17 and to effect the operation of the snap-switch element described to close the switch 24 across the terminals 25 and 26.

The movement of the plate 9 is limited within the recess 6 and it is moved to its limit by the tilting of the car to a minimum predetermined gradient and any further tilting caused by a greater angle of gradient will have no effect upon the apparatus and the oil sylphons will not be overloaded.

The lower electric terminals 25 of the grade selectors J and K are connected respectively by cables 28 and 29 with the contacts 30 and 31 respectively on the switch panel H.

A pair of electrically connected contacts 30' and 31' are arranged in juxtaposition to the contacts 30 and 31 respectively and these are connected by a cable 32 to the electrical system as will be hereinafter described.

A rocker arm 33 is pivotally mounted on a rigid bracket 34 upon the panel H and carries at opposite ends the roller contacts 35 and 36 which are adapted to bridge respectively the contacts 30 and 30' and 31 and 31'.

Electro-magnets 37 and 38 have their respective cores operatively connected at the opposite ends of the rocker arm 33 and these magnets are energized in a manner to be hereinafter described.

A pivotal balance bar 39 is connected to the magnet cores at their bottom ends and tension springs 40 supported from the bracket 34 at either side of the pivot of the balance bar hold the bar 33 normally out of contact with either of the contacts 30 and 31.

The car is equipped with a generator A of the reversible type which is operatively connected with the running gear of the car in a well-known manner.

The generator A is of the self-excited shunt-wound type, with two sets of collecting brushes. One set of brushes *a*, *a* diametrically opposed are mounted upon the collecting ring *b*. The other set of brushes *c*, *c* diametrically opposed are mounted on the collecting ring *d* and both brush rings *b* and *d* are carried by, but insulated from, the polarity ring *e*, which ring is free to rotate between the stops *f*, *g*, which are arranged 90 mechanical degrees or 180 electrical degrees apart.

The polarity ring is rotated to bring the stop lug h thereon against either of the fixed stops f, g, through the frictional contact of the brushes a, a and c, c engaging the commutator of the armature i which rotates in either direction in accordance with the direction of movement of the car.

The 90° movement of the brushes and brush rigging enables the brushes a, a to maintain positive polarity and the brushes c, c to maintain negative polarity regardless of direction of armature rotation, consequently the stud b' on the ring b is always a positive connection and the stud d' on the ring d is always a negative connection.

The generator field coils j, k, l and m are connected in series, the coils j and l producing south poles and the coils k and m producing north poles.

A stud n radially mounted on the polarity ring e engages and electrically connects the spring contact fingers o, p, when the lug h engages the stop f and said stud engages and electrically connects the spring contact fingers q, r, when the lug h engages the stop g. The stud is insulated from the ring.

It will be noted particularly on reference to the wiring diagram, Figure 1, that the magnet 37 of the switch panel H has one terminal connected through the cable 41 to the contact o of the generator and the magnet 38 has one terminal connected by the cable 42 to the contact q of the generator.

The positive post b' of the generator is connected by the cable 41' to the main fuse 42' and the cable 43 connects the main fuse to the field fuse 44 which is connected by cable 45 to the carbon pile field-regulating resistance 46 and the cable 47 connects in series with the auxiliary carbon pile rheostat 48, which in turn is connected through the cable 49 in series with the field coils m, l, k and j, which are electrically connected to the negative collector post d' of the generator.

Cable leads 50 and 51 connect the main fuse 42' with the series coil 52 and the shunt coil 53 of the cumulative compound coil and a zero temperature co-efficient resistor 54 is arranged in series with the coil 53. The field regulating resistance 46, the series coil 52, the shunt coil 53 and the zero-co-efficient resistor 54 are so designed that increasing current in coil 52 and increasing voltage across 53 and 54 results in increasing the resistance of 46 thereby weakening the strength of the shunt field.

An air dash pot 55 eliminates rapid change in the position of the plunger in the resistance 46 and thereby prevents a hunting action.

A coil tension spring 56, supported from a rigid bracket on the panel, exerts a constant tension on the pivotal arm 57 connected to the plunger of the resistance 46.

On the main switch panel C are arranged four coils, a series coil 58 which is connected by the cable 59 to the coil 52 and three shunt coils 60, 61, 62, which co-operate with the magnet armature 63. A switch indicated in general as having a stationary contact c and movable switch elements 63, 64 and 65 is mounted on the panel C and is adapted to control the connection of the generator through the cable 59 to a storage battery E. The coils 60 and 61 are connected in series while the coil 62 is connected at one end with the generator contact fingers p—r and with the switch element 64 and at the other end to the stationary contact c of the movable switch element 64 which is the battery side of the switch and is thus short circuited when the main switch element 64 is closed. The coils 60 and 61 are cumulative in their action on the armature 63, while the coil 62 is differential to 61 while the switch element 64 is open and acts as an auxiliary lock to prevent the armature 63 from moving so long as there is a voltage differential across the terminals.

The series and shunt coils 58 and 60 are cumulative in their action when the generator is supplying proper voltage, but as negligible current flows in 58 until the switch is closed, the cumulative action occurs only with closed circuit. Concurrently with the closing of the main switch element 64, the auxiliary brush 65 short circuits part of the coil 60, reducing its strength and consequently making the switch action sensitive to a reversal of current in the coil 58, which occurs when the generator voltage is reduced below the battery voltage, as will hereinafter appear.

It will be noted from Fig. 1 that the main movable switch element 64 is connected to conductor 69' and also that one side of coil 62 is also connected to 69'. As will appear conductor 69' is connected to the positive side of the battery through fuse and switch 88', cables 89 and 85. The other end of coil 62 is connected to the stationary contact c of switch panel C. When the main movable switch element 64 closes on the stationary contact c both ends of coil 62 are connected to 69', and the coil is consequently short circuited. The polarity of conductor 69', however, remains positive as it is connected to the positive generator brush after 64 has closed. As 69' remains positive cables connected to it remain positive also, and so cable 67, which feeds the fingers p and r in the generator, continues to supply positive voltage to these fingers regardless of whether the main switch element 64 is open or closed.

It will also be apparent from Fig. 1, that resistor 54, and coil 61 are connected by cables 69 and 68 to the negative generator brush $d'$, and that another cable 90 connects these all together and to battery negative through one pole and fuse of switch 88 and cable 87.

The cable 69' is connected to the upper terminals 26 of both grade selectors J and K thus connecting them with the positive pole of the battery E and the positive brush $b'$ of the generator.

The auxiliary carbon pile rheostat 48 is arranged on the panel L with a shunt coil 70 encircling its armature. This shunt coil is energized by a relay 71, the coil of which is electrically connected to the cable 32 connecting the contacts 30' and 31' of the automatic transfer switch H, the other terminal 72 of the relay coil being connected to one terminal of the shunt coil 70, the other terminal of which is connected through the cable 73 to the armature 74 of the relay 71. The shunt coil 70 is connected to negative battery and generator poles through the cables 72' and 69. Similarly the coils 37 and 38 of switch H are connected to negative battery and generator poles through conductors 75 and 69, the positive connections being through the conductors 41 and 42 respectively.

The circuit to the shunt coil 70 is completed through the terminal 76 and cable 77 to the cable 69' and knife switches.

A branch cable 78 connects with the terminal 79 of the ampere hour meter 80. The other terminal 81 of the meter 80 is connected through the cable 82 to the positive battery connection.

The meter 80 is preferably fitted with a cam 83' which may be moved to close the contacts 79 and 81 at a pre-selected value of ampere hours still remaining in the battery E which has its positive terminal 84 connected to the meter through the cable 85 and its negative terminal 86 connected through the cable 87 to one pole of the knife switch 88, the other pole of which is connected to the meter through the cable 89.

The knife switches are connected by a cable 90 to the negative collector post $d'$ of the generator.

The power circuit switch 83 has connected to its outer terminal a plurality of outlets 91 and 92 which provide plug-in connections for the cables 93 for connecting the electrical system with the containers carried on the car and which are fitted with suitable refrigerating and heating devices operated electrically.

A train line switch 94 is provided in connection with the power circuit switch 83 and to it are connected a pair of terminals 95 and 96 to enable connection being made between the cars of a train so that the electrical equipment herein described may be utilized in connection with an adjoining car in which the generating equipment may be out of order or for one which is not provided with a generating equipment.

In describing the operation of this device it is assumed that the car is started in a direction causing clock-wise rotation of the armature of the generator A and the friction of the armature on the brushes $a, a, c, c$ has rotated the ring $e$ until the lug $h$ is in engagement with the stop $f$ and the stud $n$ has closed electrical contact between the contacts $o$ and $p$. As the car continues to move a voltage in the generator is created.

The voltage created builds up the field strength but the resistance of the auxiliary rheostat 48 is of such value that at no car speed is the voltage sufficient to balance the battery voltage, hence the main switch 64 on the panel C cannot close and the load of electrical energy required is taken from the battery.

The track grades over which the car travels will at times present down grades which will cause the mercury column to operate the selector switch J—K at the lower end of the car to short circuit the contacts 25 and 26. The car is of course in motion and, depending on the direction of travel, the rotation of the generator armature effects the bridging of the contacts $p, o$ or $q, r$ and the coil 37 or 38 of the automatic transfer switch is energized by battery current from + battery conductors 85, 89, 69', 67 to contacts $p, o$, conductor 41, coil 37, conductors 75, 69, 90 and 87 to − battery, or to contacts $r, q$, conductor 42 to coil 38, conductors 75, 69, 90 and 87 to − battery.

The closing of the contacts 25 and 26 in the grade selector member J, K, as previously described, directs current from the positive battery stud 84 through meter 80, conductor 89, switch 88', conductor 69' to the contact 26, then across the switch to contact 25, (assuming that selector J has been actuated by down grade conditions) then by conductor 28 to contact 30 of switch H, across the conductor 35 to contact 30', then by conductor 32 to the coil 71 of the relay, returning by conductor 72 to 69 and from thence to the conductor 90 and over the previously mentioned conductors to the negative battery terminal.

Upon the closing of the relay 71 a circuit is closed through the coil 70. This circuit is from the conductor 69' over previously described conductors, then by conductor 77 to relay contacts 76 and 74, from thence through the conductor 73 to the coil 70 and returning to negative battery stud, as previously described.

When the coil 70 is energized the carbon pile 48 is gradually short circuited and the dash pot 55' connected with its armature prevents too rapid increase in field strength and consequently in the voltage. As the voltage increases the regulating coil 53 is strengthened and this results in proper voltage regulation.

When the generated voltage has been regulated to a value slightly above the battery voltage, that is approximately 33 volts, the main switch coils operate the armature 63 to close 64 and 65 and this results in the electrical charge from the generator being directed into the battery and load circuits.

When the track grade is reduced to relieve the pressure on the sylphon 19 so as to permit the compression spring 22 to open the switch between the contacts 25 and 26, the relay 71 is opened and an open circuit is created through the coil 70.

The resistance of the carbon pile 48 is again cut into the circuit, gradually weakening the field until the generated voltage is approximately 31 volts, whereupon the main switch opens and disconnects the generator.

It may occur that the battery strength has been reduced sufficiently to demand recharging at a time that the car is on a level track or even when going up hill. Such a condition will be indicated by the ampere hour meter. The contacts 79 and 81 in the meter will then be closed through the action of the cam 83' and this also closes the relay 71. The circuit is from the plus battery stud 84 through the fuse of the switch 88', as previously described, then by conductor 82 to the contact finger 81 of the meter and the circuit continues through the finger 79, conductor 78, to the coil 71 and by return circuit previously described, the circuit is completed to the battery negative post 86.

It will be understood from this description that the system will operate to supply electrical energy from the generator through the battery to any desired equipment and that such power is applied by the generator irrespective of the direction of travel of the vehicle and at such periods as are regulated by the gradient down which the vehicle is travelling. The pressure of the mercury as applied through the gradient operates either of the selector switches and the action of the switch H is defined by the direction of travel in the selection of which of the switches J or K is to be utilized.

The operation of all of the mechanisms utilized in this system is quite positive and they have all been established as being thoroughly reliable under such conditions as they would be subjected to in vehicular work and the equipment, when applied to a railway car or transportation truck, may be utilized to great advantage in operating individual heating or refrigerating systems in containers adapted to be transported either by truck or railway transportation. The equipment is particularly applicable to railway transportation as it automatically adjusts itself and operates with equal efficiency irrespective of the direction of travel of the vehicle and being entirely automatic, it requires no manual setting of any kind in order to ensure its operation.

What I claim as my invention is:—

1. A supplementary power plant for transport vehicles, comprising an electric generator operatively connected to the running gear of the vehicle, means for storing electric energy produced by said generator, means governed by the relative position of the vehicle in respect to level for controlling the electrical output of the generator, and means automatically controlled by the generator for selecting the governing mechanism.

2. A supplementary power plant for transport vehicles, comprising an electric generator operatively connected to the running gear of the vehicle, means for storing electric energy produced by said generator, means governed by the relative position of the vehicle in respect to level for controlling the electrical output of the generator, and means electrically controlled in accordance with the direction of travel of the vehicle to automatically determine the effect of said governed means on the generator output.

3. A supplementary power plant for transport vehicles, comprising an electric generator operatively connected to the running gear of the vehicle, means for storing electric energy produced by said generator, means governed by the relative position of the vehicle in respect to level for controlling the electrical output of the generator, means including control coils to be selectively energized in accordance with the direction of travel of said vehicle co-operating with said governed means to automatically modify the effect thereof on the generator under certain grade conditions, and switch means selectively controlling the energizing of said control coils in accordance with the direction of travel of the vehicle.

4. A supplementary power plant for transport vehicles, comprising an electric generator operatively connected to the running gear of the vehicle, means for storing electric energy produced by said generator, means governed by the relative position of the vehicle in respect to level for controlling the electrical output of the generator, means electrically controlled in accordance with the direction of travel of the vehicle to automatically determine the effect of said governed means on the generator output, and means operating independently of both said grade control and direction control means and substituting the same to control the output of the generator to the battery regardless of either grade conditions or the direction of movement of the vehicle when said battery becomes discharged to a predetermined point.

5. A supplementary power plant for transport vehicles, comprising an electric generator operatively connected to the running gear of the vehicle, means for storing electric energy produced by said generator, means governed by the relative position of the vehicle in respect to level for controlling the electrical output of the generator, electrically operated means for selecting the governing mechanism, and means actuated by the rotation of the generator armature for controlling said selecting means.

6. A supplementary power plant for transport vehicles, comprising means for storing electric energy, a generator adapted to operate in reverse directions, a charging circuit including said generator and storage means, contacts arranged on said generator and spaced apart, a contact member operated by the rotation of the generator armature to engage either of said contacts in accordance with the direction of rotation, electromagnets selectively energized from said contacts in accordance with the contact engaged by the operated contact, a switch member co-operating with said magnets, control circuits associated with said charging circuit and selectively controlled by said switch member in accordance with the operation of the latter by said magnets, and means governed by the relative position of the vehicle in respect to level for further controlling said control circuits to determine the opening and closing of said charging circuit.

7. In a supplementary power plant for transport vehicles, the combination of a generator having a pair of floating brush rings and a polarity ring carried thereby, a contact member carried by said polarity ring, two pair of electric contacts adapted to be selectively engaged by the contact on said polarity ring in accordance with the direction of movement of the generator armature, means for storing energy produced by said generator, a charging circuit including said generator and storing means, circuits connected with each of said pairs of contacts and selectively energized therefrom and including electromagnets, switch members operative through the selective energizing of said electromagnets, electric control circuits associated with said charging circuit and selectively controlled by said switch members in accordance with the selective energizing of said magnets, and switch means co-operating with said former switch means and governed by the relative position of the vehicle in respect to level for controlling the closing of said control circuits to determine the opening and closing of said charging circuit.

8. In a supplementary power plant for transport vehicles, the combination with an electric generator, a storage battery, means for controlling a flow of current from the generator to the storage battery and preventing a return flow in accordance with the speed of travel of the vehicle, and hydrostatic means for controlling said electric circuits in accordance with the relation of the vehicle to level, of means for selectively governing the aforesaid control means actuated automatically through the direction of movement of the generator.

9. A supplementary power plant for transport vehicles, comprising an electric generator operatively connected to the running gear of the vehicle, a storage battery connected with said generator, resistances arranged in the field circuit of the generator, a coil associated with one of said resistances adapted to effect short circuiting thereof, a switch arranged in the circuit of said coil, a relay operating said switch, control circuits each adapted when closed to energize the relay to operate said switch, hydrostatically controlled switches selectively closing said control circuits in accordance with the angularity of the car in respect to level, and a selective switch electrically connected with said generator and automatically determining the operation of said relay in accordance with the direction of movement of the vehicle.

10. A supplementary power plant for transport vehicles, comprising an electric generator operatively connected to the running gear of the vehicle, means for storing electric energy produced by said generator, means automatically controlling the flow of current between the generator and said storage means, switch mechanisms arranged at each end of the car for controlling the operation of said automatic controlling means, fluid pressure means for operating said switch mechanisms, hydrostatic means for operating said fluid pressure means, and means for limiting the hydrostatic pressure applied.

11. A supplementary power plant for transport vehicles, comprising an electric generator operatively connected to the running gear of the vehicle, means for storing electric energy produced by said generator, means automatically controlling the flow of current between the generator and said storage means, switch mechanisms arranged at each end of the car for controlling the operation of said automatic control means, fluid pressure means for operating said switch mechanisms, hydrostatic fluid containers arranged at each end of the car and connected by a tube, diaphragms closing said containers, and means arranged between said diaphragms and said fluid pressure means having a definite limitation of movement.

12. A supplementary power plant for transport vehicles, comprising an electric generator operatively connected to the running gear of the vehicle, means for storing electric energy produced by said generator, means automatically controlling the flow of current between the generator and said storage means, switch mechanisms arranged at each end of the car for controlling the operation of said automatic control means, fluid pressure means at each end of the car for operating said switch mechanisms, a tube arranged horizontally of the car, a cup connected to each end of said tube, said cups and tube containing a heavy fluid, a flexible diaphragm closing the top of each of said cups, a cover secured to each of said diaphragms and having an offset flange forming a shallow recess above the diaphragm, a plate resting loosely upon the diaphragm within each of said recesses and limited to movement therein, and a compressible sylphon secured to each of said plates and forming part of the fluid pressure means at each end of the car.

13. A supplementary power plant for transport vehicles, comprising a generator operatively connected with the running gear of the vehicle, a battery connected with the generator, a tube extending longitudinally of the car, a cup connected to each end of said tube, said cups and tube being filled with mercury, diaphragms covering said cups, casings secured to said cups above said diaphragms, discs arranged within said casings and supported upon said diaphragms and having a limited movement, sylphon bellows secured to each of said discs and housed within said casings, flexible tubes connected to said sylphon bellows, cylinders supported on the vehicle, connected to said flexible tubes, sylphon bellows closing said cylinders and forming a seal therefor, casings supporting said cylinders and having snap switch elements arranged therein, stud members secured to said latter bellows and engaging said switch members, electrical contacts adapted to be bridged by said switch members, means governed by the bridging of said electrical contacts for controlling the connection of the generator with the battery, a selective electrical switch associated with said snap switch for controlling its action on the means governed thereby, and means operated by the generator for operating said selective switch.

14. A supplementary power plant for transport vehicles, comprising a storage battery, a generator arranged in circuit with the battery and operatively connected with the running gear of the car, controlled circuits adapted to be selectively closed to control the generator circuit, switches for selectively closing said control circuits, hydrostatic means for controlling said switches to selectively move them to closed position in accordance with grade conditions encountered by said vehicle, electrical contacts arranged in the circuits to said selective switches to be bridged to complete either of said control circuits, an automatic transfer switch adapted to cooperate with said electric contacts to selectively include either of said selector switches, and means for automatically operating said automatic switch in accordance with the direction of operation of said vehicle whereby the closing of either of said control circuits is dependent on the cooperative relation of said selective switches and automatic transfer switch as determined by grade conditions and direction of travel respectively.

15. In an axle driven car generating system including a generator connected to a storage battery, a regulator for the generator, means to control the operation of said generator regulator including a control relay connected to energize an operating coil of said regulator, the energizing coil of the control relay being connected at one end to one terminal of the battery and at the other to two parallel circuits running to the other terminal of the battery, each parallel circuit including two switches connected in series, means to automatically selectively close one switch in each circuit in accordance with a definite direction of generator rotation and means to selectively close one switch in each parallel circuit in response to a departure of the car body from a horizontal, the sequential closing of said switches being so chosen that said control relay is only energized when the car is travelling down grade.

16. In an axle driven car generating system including a generator connected to a storage battery said generator having floating brush rings and a polarity ring operated thereby, a pair of control contacts mounted on the generator substantially 180 electrical degrees apart, a switch member carried by said polarity member into selective engagement with said control contacts in accordance with the direction of rotation of the generator armature means for effecting a connection between said switch member and the battery to cause the engaged control contact to be energized, electromagnets energized selectively from said contacts, selective switch means actuated by said electromagnets, means for permitting a flow of current from the generator to the battery and preventing a return flow of current from the battery to the generator in accordance with the generator output, means for regulating the output of said generator, and means actuated in response to a departure of the car body from horizontal cooperating with said selective switch means to control said output regulating means.

17. In an axle driven car generating system including a generator connected to a storage battery said generator having floating brush rings and a polarity ring operated thereby, a pair of control contacts mounted on the generator substantially 180 electrical degrees apart, a switch member carried by said polarity member into selective engagement with said control contacts in accordance with the direction of rotation of the generator armature means for effecting a connection between said switch member and the battery to cause the engaged control contact to be energized, electromagnets energized selectively from said contacts, selective switch means actuated by said electromagnets, means for permitting a flow of current from the generator to the battery and preventing a return flow of current from the battery to the generator in accordance with the generator output, and means for regulating the output of said generator including hydrostatically controlled means selectively co-operating with said selective switch means in response to a departure of the car body from horizontal.

18. In an axle driven car generating system including a generator connected to a storage battery said generator having floating brush rings and a polarity ring operated thereby, a pair of control contacts mounted on the generator substantially 180 electrical degrees apart, a switch member carried by said polarity member into selective engagement with said control contacts in accordance with the direction of rotation of the generator armature means for effecting a connection betwen said switch member and the battery to cause the engaged control contact to be energized, electromagnets energized selectively from said contacts, selective switch means actuated by said electromagnets, means for permitting a flow of current from the generator to the battery and preventing a return flow of current from the battery to the generator in accordance with the generator output, means for regulating the output of said generator including secondary selective switch means selectively co-operating with said first-mentioned selective switch means, and hydrostatic means actuating said secondary selective switch means in response to a departure of the car body from horizontal.

WILLIAM P. KELLETT.